Patented Nov. 15, 1927.

1,649,383

UNITED STATES PATENT OFFICE.

HENRY BLUMENBERG, JR., OF MOAPA, NEVADA.

PROCESS OF PRODUCING ALUMINUM CHLORIDE.

No Drawing.   Application filed August 31, 1926.  Serial No. 132,887.

My invention relates to a process of producing aluminum chloride and has for its object to produce the same in a simple, efficient and economic manner.

As well known, large quantities of aluminum chloride are used in the production of gasoline and the only obstacle of its universal use is the rather high cost of aluminum chloride.

My invention is based on the fact that sulphate of aluminum will react with the chlorides of the alkali metals and alkaline earth metals.

My invention consists in the steps of the process hereinafter described and claimed.

I prefer to take aluminum sulphate and potassium chloride as my metal chloride as the reagents in producing aluminum chloride. While the two salts may be used in molecular proportions as indicated in the chemical equation immediately to follow, it is advisable to use a slight excess of aluminum sulphate. Both salts are first thoroughly dehydrated, using a temperature up to 110° C. or higher, and they are both ground to about 100 screen mesh and thoroughly mixed. The mixture is then slowly heated in a closed retort to a temperature of 600 and 700° C, care being taken to always maintain the temperature below the volatilization point of the potassium chloride which is about 735° C. otherwise a double salt of aluminum potassium chloride $AlCl_3KCl$ will be formed.

The two salts react as follows:

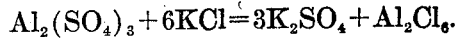

$$Al_2(SO_4)_3 + 6KCl = 3K_2SO_4 + Al_2Cl_6.$$

The aluminum chloride begins to distil or sublime slightly below 200° C and is conducted to a suitable condenser for the recovery of the aluminum chloride.

It is advisable to add a small quantity from 10–20 per cent of carbonaceous matter such as gas carbon, sawdust, pulverized coal and the like, to the mixture in the retort which appears to assist the reaction, probably by converting the sulphate into a sulphide, causing the reaction to take place more rapidly and efficiently.

At the end of the reaction the potassium salts retained in the retort may be recoved and prepared for the trade.

In place of potassium chloride other chlorides of the alkali metals and alkaline earth metals, or a mixture thereof, may be used.

Various changes may be made by those skilled in the art without departing from the spirit of my invention, as claimed.

I claim:

1. A process of producing aluminum chloride comprising mixing aluminum sulphate with potassium chloride, heating the mixture in a closed chamber in the presence of a reducing agent to a degree at which aluminum chloride is formed and below the volatilization point of the potassium chloride and condensing the aluminum chloride vapors formed.

2. A process of producing aluminum chloride comprising mixing aluminum sulphate with potassium chloride, heating the mixture in a closed chamber in the presence of carbonaceous matter to 600–700° C. and condensing the aluminum chloride vapors formed.

In testimony whereof I have signed my name to this specification.

HENRY BLUMENBERG, JR.